2,966,472

NON-CELLULAR POLYURETHANE COATING RESISTANT TO DISCOLORATION

Robert J. Fiel, Buffalo, N.Y., assignor to Allied Chemical Corporation, a corporation of New York No Drawing. Filed June 26, 1957, Ser. No. 668,039

6 Claims. (Cl. 260—18)

This invention relates to non-cellular polyurethane products and more particularly refers to fast-drying polyurethane films of superior stability against discoloration combined with excellent physical and chemical properties.

Polyurethane products derived from castor oil and the like have been suggested as coating compositions. Such coatings should produce fast-drying films of excellent and superior physical properties and chemical resistance, including particularly color stability. However, polyurethane resins of this class tend to undergo gradual discoloration upon aging and exposure to light, which greatly detracts from their applicability to many of the purposes to which they are otherwise well suited. The cause of discoloration is not clearly known, but would appear to be due to the general action of light.

An object of the present invention is to provide a method for the reaction of polyurethanes of this class containing free isocyanate groups with N-hydroxy alkyl tertiary amine compounds to produce a non-cellular polyurethane coating of superior stability against discoloration combined with excellent physical and chemical properties. Another object is to provide coating compositions which produce fast-drying films possessing resistance to discoloration on aging and exposure to light. Other objects and advantages will be apparent from the following description.

In accordance with the present invention, fast-drying film having superior stability against discoloration combined with excellent physical and chemical properties may be obtained by applying to a surface to be coated a composition produced by reacting a monobasic fatty acid triglyceride having a hydroxyl number of at least 50, such as castor oils, hydrogenated castor oils, blown linseed oils and blown soya oils, preferably castor oil, with a polyisocyanate of the aromatic series such as triphenylmethane 4,4′4″-triisocyanate, benzene-1,3,5-triisocyanate, toluene-2,4,6-triisocyanate, preferably the diisocyanates such as the tolylene diisocyanates, the phenylene diisocyanates, diphenyl methane-4,4′-diisocyanate, dimethyldiphenylmethane diisocyanates and the naphthalene diisocyanates, in such proportion that the ratio of (the number of) hydroxyl groups in the triglyceride to (the number of) isocyanate groups in the polyisocyanate is in the range of 1:1.5 to 1:4.0, preferably about 1:1.8–2.5, reacting said monobasic fatty acid triglyceride-polyisocyanate, preferably in the presence of a liquid organic solvent such as toluene, xylene and ethyl acetate in which the monobasic fatty acid triglyceride-polyisocyanate is soluble, with a hydroxy alkylamine having the formula

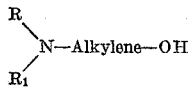

wherein R is a monovalent organic radical selected from the group consisting of alkyl, alkylene-OH, cyclohexyl and phenyl, $R_1$ is a monovalent organic radical selected from the group consisting of alkyl, alkylene-OH, and cyclohexyl, and R and $R_1$ together constitute the morpholino radical (whose nitrogen atom is the N of the formula), and wherein the alkyl and alkylene-OH radicals each contain not more than three carbon atoms, and in the absence of water. Preferably the reaction of the said triglyceride-polyisocyanate with the hydroxyalkylamine is carried out using these reactants in such proportions that the ratio of OH groups in the hydroxy alkylamine to NCO groups in the monobasic fatty acid triglyceride-polyisocyanate is in the range of from 0.05:1 to 0.8:1, and especially within the range of 0.25:1 to 0.5:1, and at a temperature within the range of 0–50° C., especially 10–35° C.

Reaction products obtained under such preferred conditions possess good storage stability (shelf life) in organic solvent solution. In the absence of moisture they show relatively little tendency toward gel formation or further "cure." Solutions of such reaction products constitute coating compositions, which require no further catalyst in use and produce fast drying, abrasion resistant films of improved resistance to discoloration by light. This storage stability combined with good drying properties, allows coating compositions of this type to be manufactured as "one-can formulations," which do not require the incorporation of additional accelerators, catalysts, etc. before use.

Instead of preparing "one-can formulations" as described above, the hydroxyalkylamine may be mixed with the monobasic fatty acid triglyceride-polyisocyanate reaction product just prior to application of the mixture as a coating composition to a surface, and the film may be cured by exposing it to the atmosphere or by heating ("baking") it in an oven at elevated temperatures e.g. 100°–200° C., to obtain cured films of excellent light stability in accordance with the present invention.

The monobasic fatty acid triglyceride-polyisocyanate may be prepared by heating a mixture of monobasic fatty acid triglyceride and polyisocyanate in the proportions noted above in a closed reaction chamber under an inert atmosphere with constant agitation at a temperature within the range of about 30 to 120 minutes. The reaction mixture may then be cooled and dissolved in xylene, or it may be initially dissolved therein. In place of xylene other suitable organic solvents or a mixture of solvents free from groups reactive with isocyanate may be used, such as toluene and ethyl acetate. Ordinarily, an amount of solvent equal in weight to the reaction mixture may be found adequate, but greater or lesser amounts of solvent may be employed if desired.

In the next step in the operation, the organic solvent solution of monobasic fatty acid triglyceride-polyisocyanate is reacted with the hydroxyalkylamine, the preferred compounds of which are N-methyldiethanolamine and dimethylethanolamine, by admixing the hydroxyalkylamine with the solution of isocyanate polyester with stirring at a low temperature and in the absence of water for a period of time of about 15 to 60 minutes. It is most important to conduct the reaction in the absence of water. Also, to produce "one can formulation" coating compositions, which possess good storage stability, it is important to maintain the temperature of the reaction below 50° C. and to employ these reactants in such proportion that the ratio of OH groups in the hydroxyalkylamine to the free NCO groups in the triglyceride-polyisocyanate is in the range of 0.05 to 1 to 0.8:1, as noted above. Under these conditions, the reaction is largely between the isocyanate groups and the hydroxyl groups of the hydroxyalkylamine, as shown by determination of free NCO groups before and after the reaction. At materially higher temperatures, the reaction proceeds further, e.g. between free NCO groups and urethane hydrogen atoms, producing high molecular weight products, which are gels insoluble in the solvent or form gels rapidly on storage, and hence are unsuitable as "one can formulations."

The number of free NCO groups in the monobasic fatty acid triglyceride-polyisocyanate reaction product to be reacted with the hydroxyalkylamine can be determined in known manner e.g. by titration with dibutylamine as described in Annalen der Chemie 562 (1949), 99. The determination gives the amine equivalent of the polyisocyanate product, which is defined as the number of grams of polyisocyanate product consumed by 1 mol of dibutylamine in forming the corresponding urea. From this the number of free NCO groups per unit weight of monobasic fatty acid triglyceride-polyisocyanate reaction product can be calculated.

Coating compositions thus obtained from castor oil triisocyanates and the novel compounds of the present invention possess appreciable storage stability in bulk, and yield films which cure (dry) rapidly on exposure to the atmosphere at ordinary temperatures and yield hard coatings, possessing outstanding adhesion, toughness, flexibility, resistance to abrasion and discoloration. Such compositions are particularly valuable for use as protective coatings on metals and wood.

The invention is illustrated by the following examples, in which parts are by weight and the degrees are in centigrade.

EXAMPLE 1

A. Preparation of isocyanate triglyceride

To 522 parts (3 mols) tolylene diisocyanate (a mixture of 80% 2,4-isomer and 20% 2,6-isomer) in an atmosphere of nitrogen or other inert gas, 933 parts castor oil (Baker's DB grade contains about 90% by weight= 0.9 mol of triglyceride of ricinoleic acid, the remainder being other glycerides and unsaponifiables plus a small amount of free organic acid, and 0.02% water) is added with constant agitation. The reaction is allowed to proceed for approximately one hour to a maximum temperature of 70°–90°. The reaction mixture is cooled to about 35° and diluted with 1515 parts of xylene. The amine equivalent of the resulting product is 450.

B. Preparation of the isocyanate triglyceride "one-can formulation"

To the xylene solution of isocyanate triglyceride prepared as above, 59.5 parts (½ mol) of N-methyldiethanolamine is slowly added (about ½ hour) at 35° with thorough stirring; care being taken that the rise in temperature does not exceed 10°. The resulting solution can be stored at ordinary temperature in the absence of moisture for an extensive period of time, e.g. 2 months and longer, without gel formation, and can be used as a coating composition without the addition of any further catalyst, accelerator or metallic soap drier. The film obtained by spreading this composition on glass and wiping with a standard doctor blade to provide a film of 0.003 inch thickness, air dried to a tack-free state in a short time, about two hours, and showed no discoloration even on prolonged exposure to light. After further air drying (curing), tests were made for color, hardness, abrasion resistance, adhesion and tensile strength, results of which are shown in Table I below.

EXAMPLE 2

The isocyanate triglyceride reaction product prepared as in Example 1-A from 522 parts of tolylene diisocyanate and 933 parts of castor oil, is dissolved in 1550 parts of a solvent mixture 1:1 by weight ethyl acetate and xylene with cooling to 40°. 59.5 parts (½ mol) N-methyldiethanolamine is added slowly during a half hour period. The mixture is then heated to 60° for one hour, after which 3.8 parts cobalt naphthenate (as 6% mineral spirits solution) and 9.6 parts lead naphthenate (as a 24% mineral spirits solution) are incorporated.

A film of this polyurethane on glass air dries to a tack-free state in 8–9 hours. The film retained a transparent white appearance on exposure to light as compared to a control film of polyurethane prepared under identical conditions without N-methyldiethanolamine, which yellowed considerably even before it had dried.

EXAMPLE 3

An isocyanate-triglyceride reaction product was prepared as described in Example 1-A but using 750 parts (3 mols) diphenylmethane-4,4'-diisocyanate in place of tolylene diisocyanate. The resulting product was then cooled to 40° C., diluted with 1685 parts of a solvent mixture 1:1 by weight of ethyl acetate and xylene, and reacted with 59.5 parts (½ mol) N-methyldiethanolamine as described in Example 1-B. Films obtained from the resulting polyurethane product showed better color stability than those similarly obtained without the use of N-methyldiethanolamine.

EXAMPLE 4

An isocyanate triglyceride in xylene solution, prepared as in Example 1-A, from 522 parts (1 mol) tolylene diisocyanate and 933 parts of castor oil (Baker's DB grade, 0.9 mol), is reacted with 66.5 parts (½ mol) N-ethyldiethanolamine at 35°. Films obtained from the resulting polyurethane showed similar general improvement in properties to that gained by using N-methyldiethanolamine.

EXAMPLE 5

The procedure of Example 3 was repeated using 90.5 parts (½ mol) N-phenyldiethanolamine in place of N-ethyldiethanolamine. Films obtained from the resulting polyurethane product showed similar improvement in color stability and other properties to those obtained with N-ethyldiethanolamine.

EXAMPLE 6

The procedure of Example 3 was repeated using 74.5 parts (½ mol) triethanolamine in place of N-ethyldiethanolamine. Films obtained from the resulting polyurethane product showed similar improvement in color stability and other properties to that obtained with N-ethyldiethanolamine.

Similar results are obtained by replacing triethanolamine in the foregoing example by an equivalent weight of N-cyclohexyldiethanolamine, N-β-hydroxyethylmorpholine, or N-propyldiethanolamine.

Table I sets forth the results obtained with coating compositions prepared according to foregoing Examples 1, 4, 5, and 6 wherein the total amount of hydroxyalkylamine agent is in the ratio of 0.5 mol hydroxyalkylamine to 0.9 mol of castor oil. The novel hydroxyalkylamine compounds of the invention produce polyurethane resins, which in general possess much better color and resistance to discoloration on aging and exposure to light than resins obtained by air-curing similar isocyanate-triglyceride reaction products in the absence of the hydroxyalkylamines of the present invention, or by using conventional accelerators, e.g. N-ethylmorpholine. An unusually valuable feature of compositions obtained with the hydroxyalkylamine compounds of the present invention is that despite their rapid drying properties when exposed in these films they possess good "shelf-life" when stored in sealed containers to prevent contact with air and moisture.

TABLE I

|  | Example 1 | Example 4 | Example 5 | Example 6 |
|---|---|---|---|---|
| Hydroxy alkylamine | N-methyldiethanolamine. | N-ethyldiethanolamine. | N-phenyldiethanolamine. | Triethanolamine. |
| Dry Time, Hours | 2 | 2 | 58 | 4. |
| Hardness, Sward [1]: | | | | |
| 24 Hours | 16 | 18 | 4 | |
| 1 Week | 24 | 18 | 10 | 20. |
| Abrasion Resistance, Taber Index [2] | 10.0 | 14.0 | 18.5 | 10. |
| Color | Excellent | Very Good | Excellent | Good. |
| Adhesion | Good | Good | Good | Good. |
| Tensile Strength | 2,230 | 910 | 1,185 | |

[1] H. A. Gardner, "Examination of Paints, Varnishes, Lacquers, Colors," 6th ed., p. 206—Sward Rocker Hardness Apparatus.
[2] Films air dried at room temperature for 48 hours—Taber index obtained using a CS-17 wheel with 1,000 g. load for 500 cycles, reported as milligram-loss (TTP=141B, Jan. 15, 1949).

EXAMPLE 7

This example illustrates the effect of varying the amounts of N-methyldiethanolamine used to react with an isocyanate polyester.

A series of coating compositions are prepared using essentially the method of Example 1. N-methyldiethanolamine is used in varying amounts to treat a xylene solution of a standard amount of the isocyanate polyester from 3 mols tolylene diisocyanate and 0.9 mol castor oil prepared as in Example 1. The results are shown in Table II.

TABLE II

| Amount N-methyldiethanolamine | Dry Time, Hours | Hardness—Sward 24 Hrs. | Hardness—Sward 1 Wk. | Abrasion, Taber Index | Color | Adhesion |
|---|---|---|---|---|---|---|
| 2 mol | Gelation | | | | | |
| 1.5 | 1 | 5 | | 13.7 | Ex | Good. |
| 1.25 | 1 | 5 | | 12.5 | Ex | Good. |
| 0.75 | 2 | 20 | 20 | 10.6 | Ex | Good. |
| 0.5 | 2.5 | 26 | 26 | 10.2 | Ex | Good. |
| 0.25 | 3.5 | 16 | 24 | 11.8 | Ex | Fair. |
| 0.1 | 7.5 | 16 | 16 | 14.8 | Ex | Fair. |
| 0 | 24 | 4 | 10 | 50–60 | Poor | Fair. |

The results shown in Table II indicate that N-methyldiethanolamine, even when used in a little more than catalytic amounts, produce films of better color properties, abrasion resistance and drying time than films obtained without its use. With increasing amounts of N-methyldiethanolamine drying time is reduced but the properties of the thoroughly dry films are not greatly affected. The use of an excess of N-methyldiethanolamine (2 mols) produces a solid, gelled reaction product, which is insoluble in the solvent.

EXAMPLE 8

This example illustrates results obtained by using dimethylethanolamine and methyldiethanolamine in varying amounts to react with a xylene solution of a standard 1 mol amount of the isocyanate polyester from 3 mols tolylene diisocyanate and 0.9 mol castor oil prepared as in Example 1. The results are shown in Table III below.

TABLE III

| Amine [1] | Dry Time, Hours | Hardness—Sward 72 Hrs. | Hardness—Sward 1 Wk. | Abrasion Resistance, Taber Index | Adhesion | Color |
|---|---|---|---|---|---|---|
| 1% DMEA | 3¾ | 24 | 25 | 7.6 | Ex | Ex. |
| 2% DMEA | 2 | 26 | 21 | not noted | Ex | Ex. |
| 4% DMEA | 1½ | 23 | 28 | 11.0 | Ex | Ex. |
| 1% MDEA | 7–22 | 14 | 21 | 15.8 | Ex | Ex. |
| 2% MDEA | 8½ | 30 | 32 | not noted | Ex | Ex. |
| 4% MDEA | 2⅝ | 34 | 25 | 2.8 | Ex | Ex. |

[1] Based on weight of castor oil-tolylene diisocyanate adduct.
DMEA=Dimethylethanolamine.
MDEA=Methyldiethanolamine.

Although certain preferred embodiments of the invention have been disclosed for purpose of illustration it will be evident that various changes and modifications may be made therein without departing from the scope and spirit of the invention.

I claim:

1. A non-cellular polyurethane coating composition produced by reacting a monobasic fat acid triglyceride having a hydroxyl number of at least 50 with an aromatic polyisocyanate is such proportion that the ratio of hydroxyl groups to isocyanate groups is in the range of 1:1.8 to 1:2.5, reacting under anhydrous conditions said monobasic fat acid triglyceride-polyisocyanate in the presence of a liquid organic solvent free from groups reactive with isocyanate and in which the monobasic fat acid triglyceride-polyisocyanate is soluble with a hydroxyalkylamine selected from the group consisting of N-methyldiethanolamine, N-ethyldiethanolamine, N-phenyldiethanolamine, dimethylethanolamine, triethanolamine, N - cyclohexyldiethanolamine, N-β-hydroxyethylmorpholine, N-propyldiethanolamine, at a temperature within the range 0–50° C. and in such proportion that the ratio of OH groups in the hydroxyalkylamine to free NCO groups in the monobasic fat acid triglyceride-polyisocyanate is in the range of 0.05:1 to 0.8:1.

2. A non-cellular polyurethane coating composition produced by reacting castor oil with tolylene diisocyanate in such proportion that the ratio of hydroxyl groups to isocyanate groups is from 1:1.8 to 1:2.5, reacting under anhydrous conditions said castor oil-polyisocyanate in the presence of a liquid organic solvent free from groups reactive with isocyanate and in which the castor oil-polyisocyanate is soluble with methyldiethanolamine in the proportion that the ratio of OH groups in the hydroxyalkylamine to free NCO groups in the castor oil-polyisocyanate is in the range of from 0.05:1 to 0.8:1 at a temperature within the range of 0–50° C.

3. A non-cellular polyurethane coating composition produced by reacting castor oil with tolylene diisocyanate in such proportion that the ratio of hydroxyl groups to isocyanate groups is from 1:1.8 to 1:2.5, reacting under anhydrous conditions said castor oil-polyisocyanate in the presence of a liquid organic solvent free from groups reactive with isocyanate and in which the castor oil-polyisocyanate is soluble with dimethylethanolamine in the proportion that the ratio of OH groups in the hydroxyalkylamine to free NCO groups in the castor oil-polyisocyanate is in the range of from 0.05:1 to 0.8:1 at a temperature within the range of 0–50° C.

4. A method of producing a non-cellular coating composition which comprises reacting a monobasic fat acid triglyceride having a hydroxyl number of at least 50 with an aromatic polyisocyanate in such proportion that the ratio of hydroxyl groups to isocyanate groups is in the range of 1:1.8 to 1:2.5, reacting under anhydrous conditions said monobasic fat acid triglyceride-polyisocyanate in the presence of a liquid organic solvent free from groups reactive with isocyanate and in which the monobasic fat acid triglyceride-polyisocyanate is soluble with a hydroxyalkylamine selected from the group consisting of N-methyldiethanolamine, N-ethyldiethanolamine, N-phenyldiethanolamine, dimethylethanolamine, triethanolamine, N-cyclohexyldiethanolamine, N-β-hydroxyethylmorpholine, N-propyldiethanolamine, at a temperature within the range 0–50° C. and in such proportion that the ratio of OH groups in the hydroxyalkylamine to free NCO groups in the monobasic fat acid triglyceride-polyisocyanate is in the range of 0.05:1 to 0.8:1.

5. A method of producing a non-cellular coating composition which comprises reacting castor oil with tolylene diisocyanate in such proportion that the ratio of hydroxyl groups to isocyanate groups is from 1:1.8 to 1:2.5 reacting under anhydrous conditions said castor oil-polyisocyanate in the presence of a liquid organic solvent free from groups reactive with isocyanate in which the castor oil-polyisocyanate is soluble with methyldiethanolamine in the proportion that the ratio of OH groups in the hydroxyalkylamine to free NCO groups in the castor oil-polyisocyanate is in the range of from 0.05:1 to 0.8:1 at a temperature within the range of 0–50° C.

6. A method of producing a non-cellular coating composition which comprises reacting castor oil with tolylene diisocyanate in such proportion that the ratio of hydroxyl groups to isocyanate groups is from 1:1.8 to 1:2.5, reacting under anhydrous conditions said castor oil-polyisocyanate in the presence of a liquid organic solvent free from groups reactive with isocyanate in which the castor oil-polyisocyanate is soluble with methyldiethanolamine in the proportion that the ratio of OH groups in the hydroxyalkylamine to free NCO groups in the castor oil-polyisocyanate is in the range of from 0.05:1 to 0.8:1 at a temperature within the range of 0–50° C.

References Cited in the file of this patent
UNITED STATES PATENTS

| | | |
|---|---|---|
| 2,779,689 | Reis | Jan. 29, 1957 |
| 2,787,601 | Detrick et al. | Apr. 2, 1957 |
| 2,833,730 | Barthel | May 6, 1958 |
| 2,864,780 | Katz et al. | Dec. 16, 1958 |
| 2,867,278 | Mallory et al. | Jan. 6, 1959 |
| 2,868,739 | Nischk et al. | Jan. 13, 1959 |
| 2,877,193 | Roussel | Mar. 10, 1959 |
| 2,879,233 | Pace | Mar. 24, 1959 |
| 2,883,359 | Muller | Apr. 21, 1959 |

FOREIGN PATENTS

| | | |
|---|---|---|
| 760,744 | Great Britain | Nov. 7, 1956 |

OTHER REFERENCES

Chem. Engineering, April 1950, pages 165–6.
Heiss et al.: Ind. Eng. Chem., 46 (#7), 1498–1503 (1954).